April 23, 1935.     F. E. LACEY     1,998,585
LAWN MOWER SHARPENING ATTACHMENT
Filed July 22, 1933
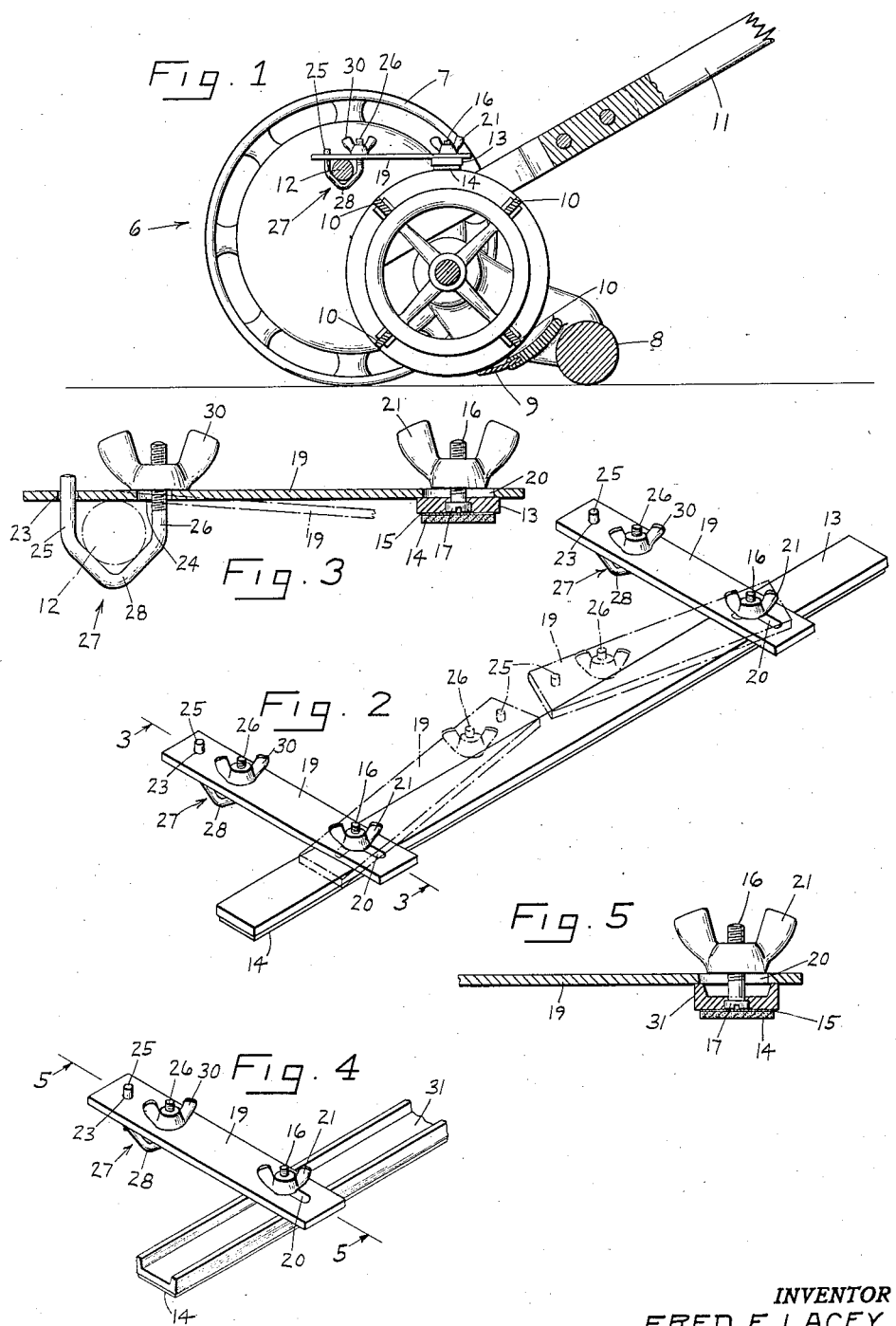
INVENTOR
FRED E. LACEY.
BY John A. Hanrahan
ATTORNEY Patented Apr. 23, 1935

1,998,585

UNITED STATES PATENT OFFICE 1,998,585

LAWN MOWER SHARPENING ATTACHMENT

Fred E. Lacey, Bridgeport, Conn.

Application July 22, 1933, Serial No. 681,711

2 Claims. (Cl. 51—250)

This invention relates to new and useful improvements in lawn mower sharpening means and has particular reference to a sharpening attachment for lawn mowers.

An object of the invention is to provide a lawn mower sharpening attachment which may be easily and quickly applied to a lawn mower and which when in proper position thereon will rapidly sharpen the rotary knives of the lawn mower.

Another object is to provide an attachment as stated and which is of simple construction and may be manufactured at low cost and sold at an attractive price.

Additional objects and advantages will later become apparent.

While satisfactory embodiments of the invention are shown in detail in the attached drawing and described in detail in the following specification it will be understood that the invention is not limited to the particulars disclosed but includes all such variations and modifications as fall within the spirit of the invention and the scope of the appended claims.

In the drawing:

Fig. 1 is a transverse sectional view through a conventional hand propelled lawn mower, showing the improved sharpening attachment in operative position thereon;

Fig. 2 is a perspective view showing the attachment alone;

Fig. 3 is a detail sectional view taken substantially along the line 3—3 of Fig. 2 on an enlarged scale;

Fig. 4 is a perspective view illustrating a slight modification; and

Fig. 5 is a detail sectional view taken substantially along the line 5—5 of Fig. 4 on an enlarged scale.

Referring in detail to the drawing, at 6 is generally indicated a portion of any lawn mower which may be either power or hand propelled and which may include ground engaging wheels of which but one is shown at 7. The mower may also include a ground engaging roller 8, a stationary or ledger blade 9, rotary cutter knives 10 and a propelling handle 11. Later, it will become apparent that the lawn mower may include any suitable ledger blade construction and any preferred type of rotary cutter knives, wheels, handle and the like. As is customary, a guard or brace bar 12 extends across the mower between the wheels thereof forwardly of the rotary knives.

The improved sharpening attachment as disclosed in Figs. 1, 2 and 3 includes a steel or other metal bar 13 to the underside of which is secured an abrasive means or member 14 which preferably comprises a rolled strap-like member of a composition including rubber or a similar suitable binder loaded with emery. This composition affords a relatively tough and efficient abrasive means of low cost. The abrasive means 14 is secured to the under side of the bar 13 by a suitable adhesive 15, the thickness of which is considerably exaggerated in Figs. 3 and 5. Of course, the adhesive should be water-proof and is of such character as to firmly secure the abrasive to the bar over one entire surface of the abrasive.

Carried by the bar 13 are a pair of upwardly projecting threaded studs 16, which studs preferably extend entirely through the bar as shown in Fig. 3. In that figure it will be noted that the stud 16 is in the form of a fillister head screw and includes the head 17 counter-sunk or forced into the lower surface of the bar whereby there is no danger of the stud being pulled through the bar and whereby the head of the stud does not interfere with the securing of the abrasive to the bar.

A pair of straps 19 are used for securing the bar 13 and the abrasive carried thereby in position whereby the abrasive may be engaged by the rotary knives of the mower in order that said knives will be sharpened. These straps carry means for clampingly receiving the guard or brace bar 12 of the mower as will later be fully set forth. One end portion of each of the straps 19 is provided with a longitudinally extending slot 20 and the straps are arranged with said end portions against the upper surface of the metal bar 13 and with the said slots 20 accommodating the threaded studs 16 carried by the bar. The slots 20 provide for an adjustment as will later be set forth and wing nuts 21 are threaded on to the studs 16 whereby to clamp the straps and bar together in the desired positions of adjustment.

In its opposite end portion each strap 19 is provided with a hole 23 and a slot 24 and such hole and slot are adapted to receive the arms 25 and 26 respectively of a clip or attaching member 27 which includes said arms in substantially parallel relation and a somewhat V-shaped connecting portion 28 connecting said arms. On the upper threaded end of each arm 26 is a wing-nut 30. When applying the attachment to a lawn mower the clamping or attaching members 27 are removed from the straps 19 and thereafter the straps are disposed with their perforated end portions against the guard or brace bar 12 of the mower and the attaching members are positioned. The positioning of the attaching members involves the disposing of the same in such position that their arms embrace the guard bar 12 and extend through the openings 23 and slots 24 respectively.

This is as shown in Figs. 1 and 2 and after the attaching member is in place the nuts 30 are applied to the arms 26 thereof. When the parts are in this position the bar 13 and abrasive means 14 should be positioned over the rotary knives with the abrasive in tangential relation to the rotary knives. To accomplish this latter it is but necessary to loosen the wing nuts 21 and adjust bar 13 and abrasive 14 forwardly or rearwardly and then tighten the nuts 21. The adjustment is, of course, provided for by the longitudinally extending slots 20 in which the studs 16 are shiftable. With the abrasive properly located the wing nuts 30 are tightened down and this will serve to slightly spring the straps 19 about the brace bar 12 so as to dispose said straps more or less in the broken line position in Fig. 3. Obviously, this will tension the abrasive against the rotary knives which it will be understood are longitudinally spiral and so arranged that as the end portion of one blade leaves the abrasive the opposite end portion of the following blade engages the abrasive.

Figs. 4 and 5 disclose a slightly modified construction. In these figures in lieu of the flat iron or steel bar 13 a channel bar 31 of aluminum is employed. The studs 16 are carried by this aluminum bar and are secured therein in the manner previously described as by having their heads 17 counter-sunk in the lower surface of the bar. Channel bar 31 is arranged with its flanges extending upwardly and the abrasive 14 is secured to the lower flat face of said bar by suitable water-proof adhesive 15. The straps 19 carrying the attaching means 27 are employed in connection with the bar 31 and the ends of these straps having the longitudinal slots 20 are arranged to span the flanges of the bar 31 and rest against the upper edges of said flanges.

This form of the invention is secured to the mower and is adjustable with respect thereto in the same manner as the form of the invention shown in Figs. 1, 2 and 3. The essential difference resides in the fact that the bar 31 being a channel bar may be made of aluminum as may also the straps 19. When aluminum is used it is, of course, of light weight and may be cheaply polished to have it of attractive appearance. Since the bar 31 is a channel bar it will be of relatively great strength.

From the foregoing description it will be apparent that my improved sharpening attachment comprises but a relatively few parts and that it may be easily and quickly applied to a lawn mower in position to sharpen the rotary knives thereof. Of course, it will be necessary that the bars 13 or 31 be made in different lengths so as to be applicable to different sizes of lawn mowers. However, the strap members 19 may be used with any size or length of abrasive carrying bar and with the bar 13 or the bar 31 so that the straps may be produced in large quantities. The attaching members 27 are so constructed that they may be used for clamping the straps to various diameters of bars 12. This is true owing to the presence of the slots 24 and the use of the substantially V-shaped connecting portion 28 of said members 27 and it will be apparent that when any clamping member 27 is tightened into position a portion of the strap 19 will bear against the upper side of the bar 12 while the angularly disposed arms of the V-shaped connecting portion of the member will each engage said bar as best shown in Fig. 3.

After the blades of the mower have been sharpened, the nuts 30 may be loosened and the attachment may be swung about the bar 12 to carry the abrasive away from the rotary knives. Thereafter, said nuts may be tightened to maintain the sharpener in inoperative position. Of course, if desired the attachment may be removed from the lawn mower when the attachment is not in use, and when the attachment is not in use the nuts 21 may be loosened and the straps swung into a position substantially overlapping the bar 13 or the bar 31 as the case may be whereby said straps are located as shown by the broken lines in Fig. 2. Alternatively the straps may be positioned to extend beyond the ends of bar 13. With the straps in either of these positions it will be apparent that the attachment will take up but little space and may be easily stored and in addition for shipment and sale the attachment may be packed in relatively long narrow cartons occupying but a minimum of space.

It will be understood that when the attachment is in use the abrasive may be tensioned against the rotary knives more or less to obtain the desired tension by tightening of the nuts 30 which nuts serve also to secure the attachment in place. With the sharpening attachment in position the grinding of the blades is accomplished by pushing the lawn mower forwardly as when mowing a lawn and, in fact, the sharpening may be done while a portion of a lawn is being mowed. Of course, the attachment may be used on a power lawn mower. After the rotary blades have been ground the ledger blade 9 must, of course, be re-adjusted. The actual operation of grinding the blades requires but a very short period of time and care should be taken to insure that the blades are not unnecessarily ground off.

Having thus set forth the nature of my invention, what I claim is:

1. In a lawn mower sharpener, a bar having an abrasive lower surface, a strap connected to and extending from said bar substantially at right angles thereto, said strap having an opening in its outer end portion and an enlarged opening inwardly of said first opening, an attaching means on the outer end of said strap and comprising a clip having a pair of connected substantially parallel arms of which one passes through each of said openings, said attaching means adapted to receive a brace bar of a lawn mower at the under side of the outer end portion of the strap with the said end portion of the strap on the upper surface of said brace bar, and a nut threaded on the upper end portion of that arm of the clip passing through the enlarged opening whereby on tightening of the nut against the strap the latter is flexed against the brace bar and the said abrasive surface is forced against the cutting knives of the lawn mower.

2. In a lawn mower sharpener, a bar having an abrasive lower surface, a strap connected to and extending from said bar substantially at right angles thereto, said strap having an opening in its outer end portion and an enlarged opening inwardly of said first opening, an attaching means on the outer end of said strap and comprising a clip having a pair of connected substantially parallel arms of which one passes through each of said openings, said attaching means adapted to receive a brace bar of a lawn mower at the under side of the outer end portion of the strap with the said end portion of the strap on the upper surface of said brace bar, a nut threaded on the upper end portion of that arm of the clip passing through the enlarged opening whereby on tightening of the nut against the strap the latter is flexed against the brace bar and the said abrasive surface is forced against the cutting knives of the lawn mower, and said attaching clip including a V-shaped portion connecting said substantially parallel arms whereby the clip is adapted to receive brace bars of different diameters.

FRED E. LACEY.